US008286688B2

(12) United States Patent
Crozier

(10) Patent No.: US 8,286,688 B2
(45) Date of Patent: Oct. 16, 2012

(54) VEHICLE WINDOW PROTECTOR

(76) Inventor: Galen Crozier, Homestead, IA (US)

( * ) Notice: Subject to any disclaimer, the term of this patent is extended or adjusted under 35 U.S.C. 154(b) by 43 days.

(21) Appl. No.: 12/876,594

(22) Filed: Sep. 7, 2010

(65) Prior Publication Data

US 2011/0056634 A1    Mar. 10, 2011

Related U.S. Application Data

(60) Provisional application No. 61/241,110, filed on Sep. 10, 2009.

(51) Int. Cl.
*B60J 1/20* (2006.01)

(52) U.S. Cl. ............. 160/370.21; 296/95.1; 296/136.13; 150/168

(58) Field of Classification Search ............. 160/370.21; 150/166, 168; 296/95.1, 97.7, 97.8, 136.13
See application file for complete search history.

(56) References Cited

U.S. PATENT DOCUMENTS

| | | | | | |
|---|---|---|---|---|---|
| 2,690,928 | A | * | 10/1954 | Boynes | 296/95.1 |
| 2,821,248 | A | * | 1/1958 | Irvine | 160/370.21 |
| 3,085,621 | A | * | 4/1963 | Meranto | 160/90 |
| 4,799,728 | A | * | 1/1989 | Akers et al. | 296/136.04 |
| 5,253,695 | A | * | 10/1993 | Nenstiel | 160/370.21 |
| 5,524,694 | A | * | 6/1996 | Arapis | 160/370.21 |
| 5,562,142 | A | * | 10/1996 | Ziel et al. | 160/370.21 |
| 5,632,318 | A | * | 5/1997 | Wang | 160/370.21 |
| 6,063,477 | A | * | 5/2000 | Ames et al. | 428/192 |
| 6,076,577 | A | | 6/2000 | Ontaneda | |
| 6,145,573 | A | * | 11/2000 | Chen | 160/368.1 |
| 6,247,518 | B1 | * | 6/2001 | Wickersty | 160/105 |
| 6,367,536 | B1 | * | 4/2002 | St Louis | 160/90 |
| 6,513,853 | B2 | * | 2/2003 | Langley | 296/95.1 |
| 6,869,127 | B2 | * | 3/2005 | Dohle | 296/146.1 |
| 7,673,924 | B1 | * | 3/2010 | Lau | 296/95.1 |
| 2004/0227373 | A1 | * | 11/2004 | Robbins | 296/95.1 |
| 2006/0000529 | A1 | * | 1/2006 | Le | 150/168 |

* cited by examiner

*Primary Examiner* — David Purol
(74) *Attorney, Agent, or Firm* — McKee, Voorhees & Sease, P.L.C.

(57) ABSTRACT

A vehicle cover is provided for covering a driver side window, central windshield, and passenger side window. The cover includes a central windshield panel, a right wing panel, and a left wing panel. The right wing panel forms a pocket with three closed sides, and an open bottom edge for covering a driver side window and frame of a vehicle. The left wing panel is a pocket formed by three closed sides and an open bottom edge so as to enclose a passenger side window and frame of the vehicle. The vehicle cover prevents ice build up on the covered windshield and side windows so as to eliminate the need to scrape ice from the windshield and side windows. The cover also blocks harmful environmental conditions that may damage both the interior and exterior of a vehicle during all times of the year.

24 Claims, 5 Drawing Sheets

VEHICLE WINDOW PROTECTOR

CROSS-REFERENCE TO RELATED APPLICATIONS

This application claims priority under 35 U.S.C. §119 of a provisional application Ser. No. 61/241,110 filed Sep. 10, 2009, and which application is hereby incorporated by reference in its entirety.

FIELD OF THE INVENTION

The present invention relates generally to a vehicle cover for reducing the effect of adverse weather conditions on the interior and exterior of a vehicle.

BACKGROUND OF THE INVENTION

Many environmental elements, including but not limited to weather, can negatively impact a vehicle's internal and external appearance and physically damage components of a vehicle. For example, sunlight may deteriorate the dashboard and seats of a vehicle, while also increasing the temperature inside the vehicle. Additionally, wintry weather may produce a layer of ice or snow on the windshield, while also freezing shut the doors of the vehicle. Much work must be done to remove the snow and ice from the vehicle before it is safe to drive.

Articles exist for protecting vehicles from the harsh weather conditions of summer or winter. Cardboard or plastic cutouts may be placed inside the windshield to block or reflect the sun from damaging the interior and increasing the internal temperature of the vehicle. Pieces of cardboard may also be used on the exterior of the windshield between the windshield and the wipers to stop snow or ice from accumulating on the windshield. However, these articles are usually large and bulky. The articles take up a large amount of space to store, and may be difficult to position so as to best block the weather conditions. Also, wind can easily blow these articles from their intended position and even completely off the windshield so as to reduce or eliminate their effectiveness. In addition, neither of these devices blocks the weather from accumulating on or penetrating through the lateral windows on the driver's side and the passenger's side.

Other prior art devices include a section for covering the windshield, as well as lateral sections for covering the driver and passenger side windows. However, these devices generally include a hook or clamp that is placed around the door frame to aid in holding the device on the vehicle. The hooks or clamps may damage the doors or frames of the vehicles because they are bulky and may get in the way of the normal function of the door. Additionally, the devices do not completely cover the lateral window and frame of the vehicle, which could allow ice and/or snow to accumulate and freeze the door shut.

Therefore, there is a need for an improved cover for covering the windshield and lateral windows of a vehicle without damaging the frame of the vehicle. There is also a need in the art for an easy-to-use vehicle cover that is able to protect a vehicle from harsh weather conditions in both hot and cold seasons.

SUMMARY OF THE INVENTION

It is therefore a primary object, feature, and/or advantage of the present invention to provide an apparatus that solves deficiencies in the art.

It is another object, feature, and/or advantage of the present invention to provide an apparatus that protects a vehicle from harsh weather conditions.

It is another object, feature, and/or advantage of the present invention to provide an apparatus that covers the windshield and lateral windows of a vehicle.

It is another object, feature, and/or advantage of the present invention to provide a vehicle cover that can provide customizable space for advertising.

It is another object, feature, and/or advantage of the present invention to provide a vehicle cover that is improves theft resistance of the vehicle.

It is another object, feature, and/or advantage of the present invention to provide a vehicle cover that can be easily stored in a portable carrying case.

It is another object, feature, and/or advantage of the present invention to provide an improved vehicle cover that does not use fatigable elastic or mechanical features to hold the cover in place.

It is another object, feature, and/or advantage of the present invention to provide a vehicle windshield protector that can be quickly and easily put on and taken off of the vehicle.

It is another object, feature, and/or advantage of the present invention to provide a vehicle window protector that is economical to manufacture and durable in use.

These and/or other objects, features, and advantages of the present invention will be apparent to those skilled in the art. The present invention is not to be limited to or by these objects, features and advantages, and no single embodiment need exhibit every object, feature, and/or advantage.

According to one aspect of the present invention, a vehicle cover is provided. The vehicle cover includes a central windshield panel, a right wing panel, and a left wing panel. The right wing panel is operably attached to the central windshield panel and includes an outer portion, an inner portion, a closed first side, a closed second side, a closed third side, and an open fourth side. The right wing panel forms a driver side pocket closed along the front, rear, and top edges and open along the bottom edge to enclose a driver side door frame and window. The left wing panel is operably attached to the central windshield panel and includes an outer portion, an inner portion, a closed first side, a closed second side, a closed third side, and an open fourth side. Additionally, the left wing panel forms a passenger side pocket closed along the front, rear, and top edges and open along the bottom edge to enclose a passenger side door frame and window.

According to another aspect of the present invention, a vehicle cover is provided. The vehicle cover includes a central windshield panel, a right wing panel having a pocket between an inner portion and an outer portion to enclose the driver side door frame and window, and a left wing panel having a pocket between an inner portion and an outer portion to enclose the passenger side door frame and window.

DETAILED DESCRIPTION OF THE PREFERRED EMBODIMENTS

Figure 1:
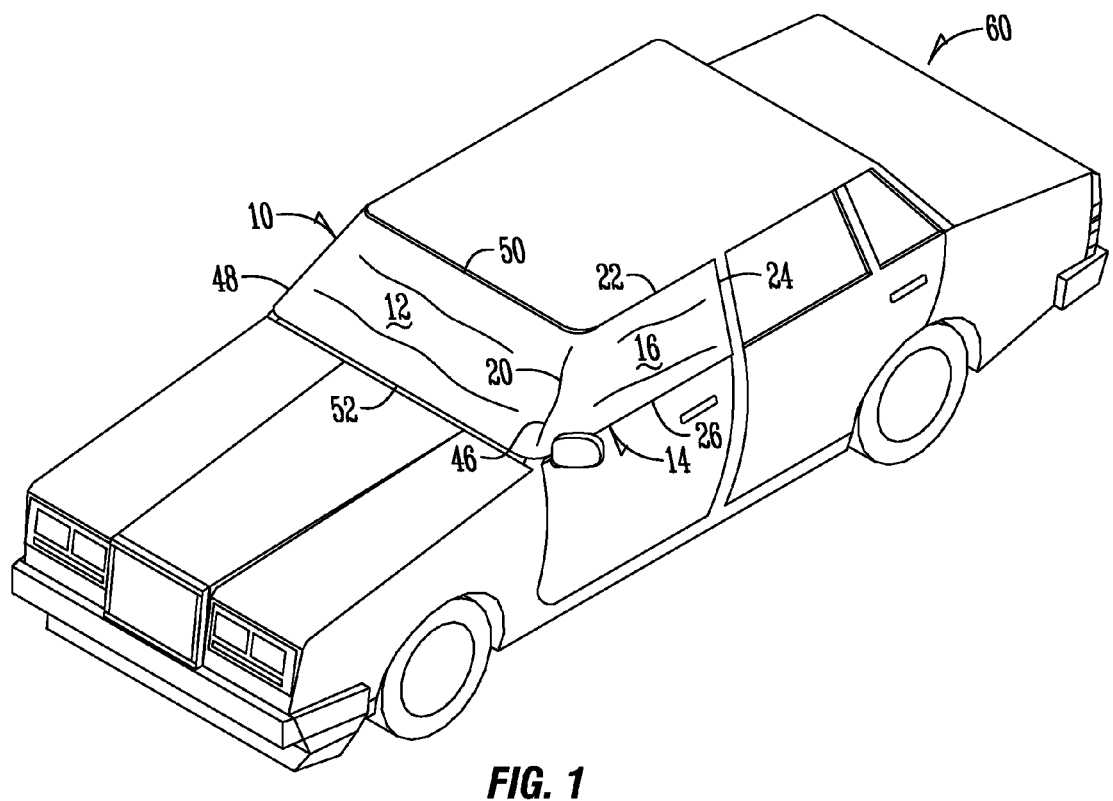
FIG. 1 is a perspective view of a vehicle including the vehicle cover of the present invention and covering the driver side window and frame.
Figure 6:
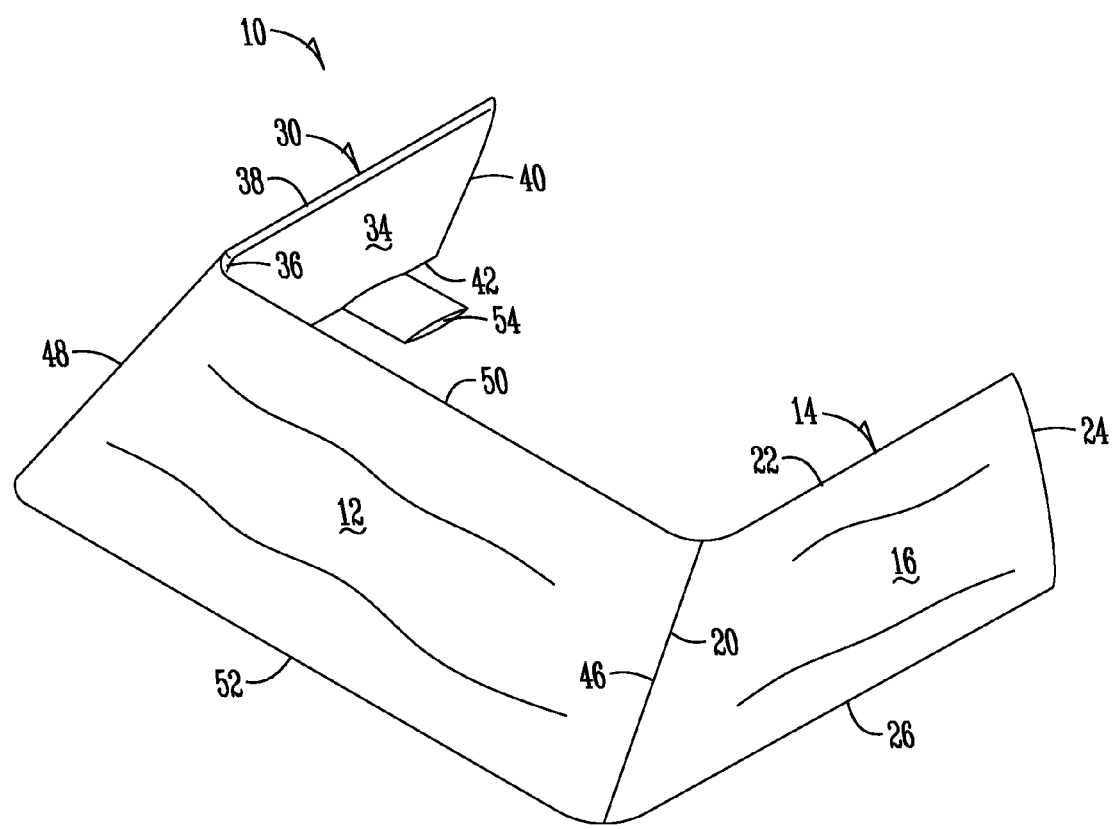
FIG. 6 is a perspective view of the vehicle cover of the present invention, apart from the vehicle.

FIG. 1 is a perspective view of the vehicle 60 including a vehicle window cover 10 of the present invention, showing the cover on the windshield and on the driver side window and frame 62. The vehicle cover 10 is placed on the vehicle 60 to protect the interior and exterior of the vehicle from environmental conditions, while also decreasing the temperature of the interior of the vehicle on hot, sunny days. The cover 10 is made of a lightweight material which can be stored in a small carrying case 54 attached to a portion of the cover 10, as seen in FIG. 6, and that can be stored and removed from the case to easily place on the vehicle.

The cover 10 includes a central windshield panel 12 for covering the windshield of the vehicle, a right wing panel 14 for covering the driver side window and frame 62, and a left wing panel 30 for covering the passenger side door window and frame 64. However, on vehicles that do not have a frame around the driver or passenger side window, the right wing and left wing panels will only cover the windows themselves. The right wing panel 14 is connected to the central windshield panel 12 along the right side 46 of the central windshield panel 12. The central windshield panel 12 also includes a left side 48, a top side 50, and a bottom side 52. The central windshield panel 12 is sized to completely cover the windshield from top to bottom and across the full width. The first side 20 of the right wing panel 14 is attached such that the right wing panel 14 is curved around the frame of a vehicle 60 when the driver side door is shut.

The right wing panel 14 includes an outer portion 16 and an opposite inner portion 18, which are two separate layers of material. The outer and inner portions 16, 18, which may be minor images of one another, are connected along a first side or front edge 20, a second side or top edge 22, and a third side or rear edge 24. The inner and outer portions 16, 18 of the right wing panel 14 are not connected along a fourth side or bottom 26. Having the fourth side 26 remain open allows the right wing panel 14 to form a driver side pocket 28, which is able to fit over and enclose the driver side door and frame 62, as explained in greater detail below.

Figure 2:
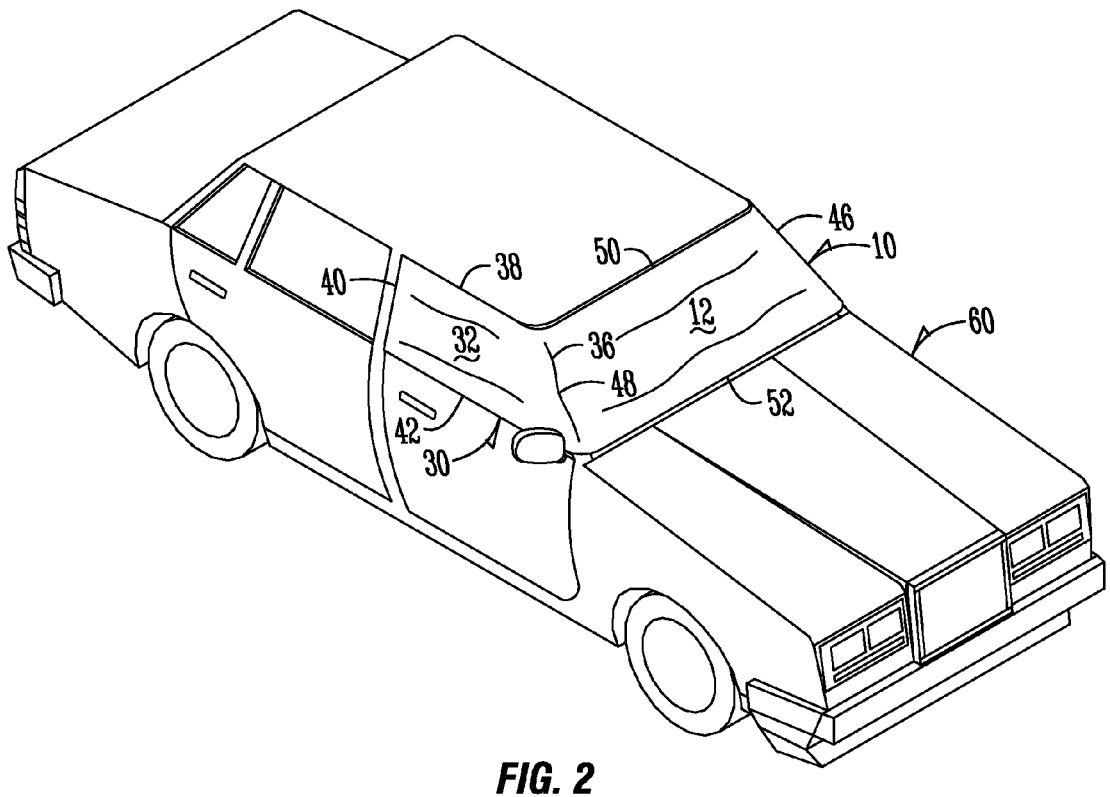
FIG. 2 is another perspective view showing the vehicle cover covering the passenger side window and frame.

FIG. 2 is a view similar to FIG. 1 from a different perspective, showing the vehicle cover 10 covering the passenger side window and frame 64. FIG. 2 shows the vehicle cover 10 including a left wing panel 30. The left wing panel 30 is connected to the central windshield panel 12 along the left side 48 of the central windshield panel 12. The left wing panel 30 includes an outer portion 32 and an inner portion 34, which are two separate layers of material, similar to the right side panel. The outer and inner portions 32, 34 are connected along a first side or front edge 36, second side or top edge 38, and a third side or rear edge 40. The outer and inner portions 32, 34 remain open along a fourth side or bottom edge 42 of the left wing panel 30. Having three sides closed with a fourth side open allows the left wing panel 30 to form a passenger side pocket 44 for receiving and enclosing a passenger side door frame 64. The cover 10 may be manufactured in several sizes, such as small, medium, and large, or may be custom made to fit specific car or truck, makes, and models.

Figure 3:
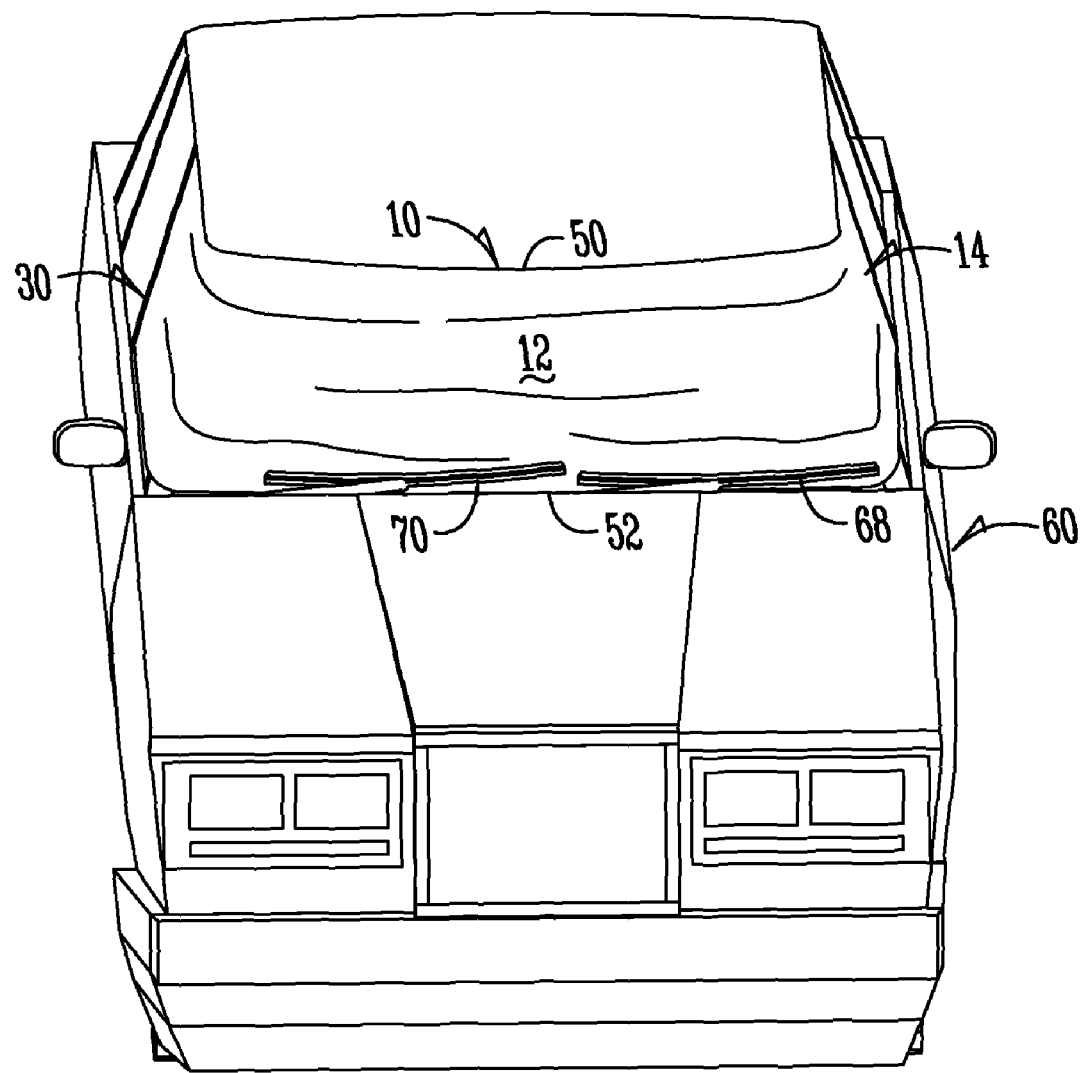
FIG. 3 is a view of the front of a vehicle with the vehicle cover of the present invention showing the central windshield panel extended to cover the windshield wipers of the vehicle.

FIG. 3 is a view of a front of a vehicle with the vehicle cover 10 of the present invention showing the bottom edge of the central windshield panel 12 covering first and second windshield wipers 68, 70 of the vehicle. The central windshield panel 12, as discussed above, includes a right side 46, a left side 48, a top side 50, and a bottom side 52. The vehicle cover 10 is comprised of a non-elastic material, which may block or deflect UV rays that are harmful to a vehicle interior. The central windshield panel 12 of the vehicle cover may include advertisement or logo. In addition, the vehicle cover 10 is water impermeable such that it will block the accumulation of snow and/or ice during wintery conditions. The impermeability of the vehicle cover 10 allows a user to simply remove the vehicle cover 10 without having to scrape or clean ice and/or snow from the windshield, which saves time and manual labor. The extension of the bottom side 52 of the central windshield panel allows the windshield wipers to be covered. Covering the wipers keeps the wipers from becoming frozen to the windshield. Because the work involved in freeing frozen wipers from a windshield may damage the wipers, having the cover 10 cover the wipers may actually lengthen the life of the wipers. In addition, because the cover 10 is stretched out across the windshield and attached at two doors, there will not be an issue of the cover flapping or coming off during windy days.

Figure 4:
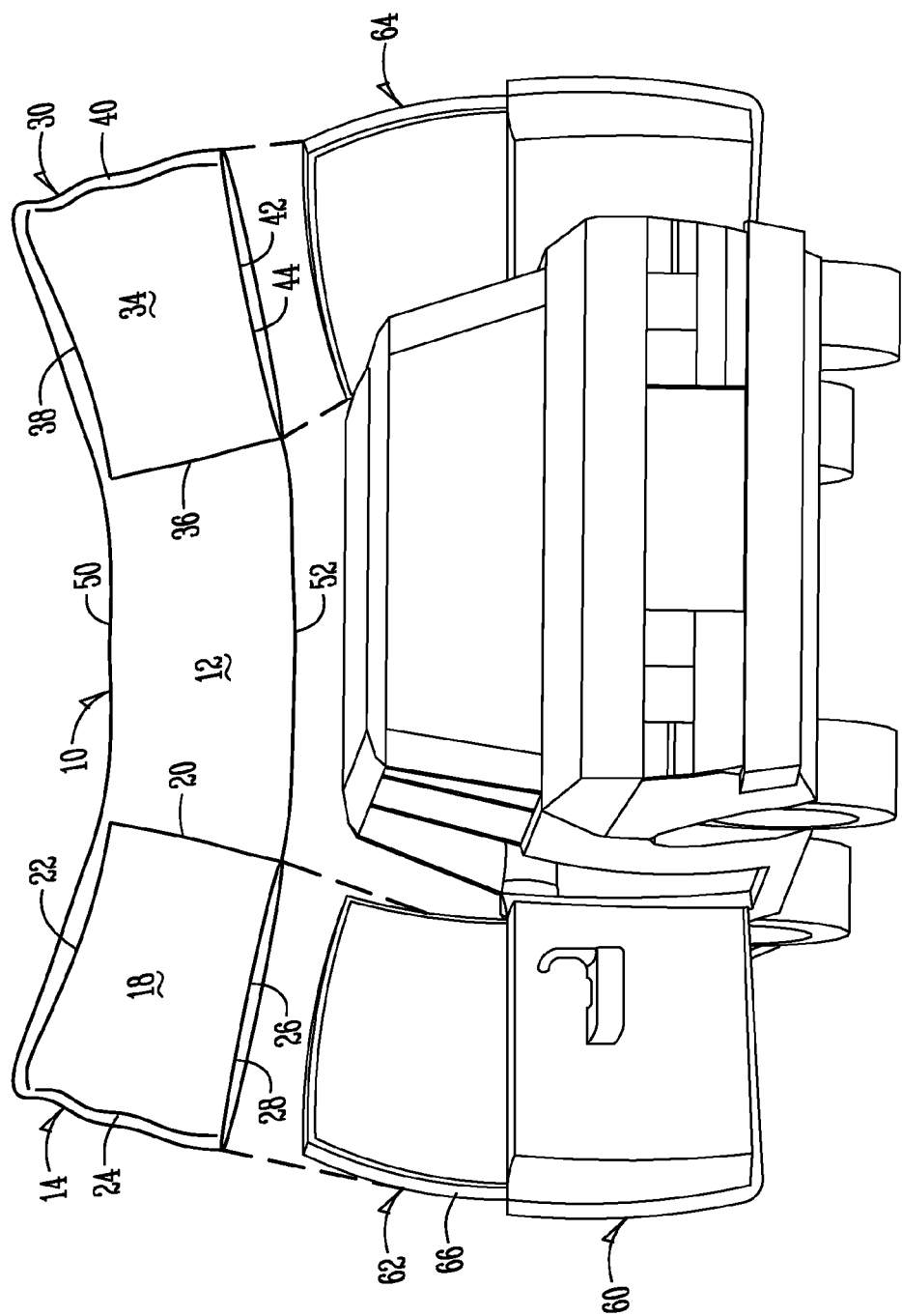
FIG. 4 is an exploded view of the vehicle cover and a vehicle from the rear of the vehicle showing how the cover is attached to the vehicle.

FIG. 4 is an exploded view of the vehicle cover 10 and a vehicle 60 from the rear of the vehicle showing how the vehicle cover 10 is attached to the vehicle. In use, the vehicle cover 10 works as follows. The vehicle cover 10 is removed from the carrying case 54. The cover 10 is unfolded to its full size. The driver side door 62 and the passenger side door 64 are both opened. Then, the driver side pocket 28 is placed or pulled downwardly over the driver side window and frame 62 such that the top of the window and frame are adjacent the top edge 22 of the right wing panel 14. Additionally, the first side or front edge 20 of the right wing panel 14 will generally reside between the window and frame and the central windshield panel 12. The driver side pocket 28 fully encloses the driver side window and frame 62, but does not interrupt the door seam 66 between the door and the rest of the vehicle. This is important such that the door will still be fully closed with the cover 10 on the window and door frame.

The central windshield panel 12 is then strung across the windshield of the vehicle 60. Because the first side 20 of the right wing panel 14 is connected to the central windshield panel 12 at the right side 46 of the central windshield panel 12, the central windshield panel 12 will merely wrap around or across the front edge of the windshield and is able to be strung across the windshield. The left wing panel 30, which is connected to the central windshield panel 12 at the first side or front edge 36 of the left wing panel 30 and the left side 48 of the central windshield panel 12, is wrapped around the left side of the windshield of the vehicle 60. The left wing panel 30, which includes the passenger side pocket 44, is then placed or pulled downwardly over top of the passenger side window and frame 64. The pocket 44 is formed by enclosing first side 36, second side 38, and third side 40 of the left wing panel 30 and leaving fourth side or bottom edge 42 open. As can be seen in FIG. 4, the left and right wing panels 30, 14 are mirror images of each other about an imaginary line through the central windshield panel 12. Once the vehicle cover 10 has been placed over the driver side window and frame 62, across the central windshield, and then placed over the passenger side window and frame, the driver side door 62 and the passenger side door 64 are closed, so as to retain the cover 10 in position over the vehicle windshield and side windows. The substantially full coverage of the door frame and window assures that the cover stays in position and makes theft of the cover difficult.

The material of the vehicle cover 10 does not impede the closing of the doors. The closed doors ensures that the vehicle cover 10 will be tightly strewn across the windshield, as well as held in place. The doors provide locking mechanisms to keep the vehicle cover 10 from coming undone or being removed by either weather or another individual. In addition, because the central windshield panel 12 is strung across the windshield of the vehicle 60, an advertisement can be placed on said central windshield panel 12 for others to see when walking or driving by a vehicle with the vehicle cover 10 installed. The cover does not affect key holes in the doors, but may include a flag to cover the key hole.

The vehicle cover 10 of the present invention is beneficial in both summer and winter conditions. For instance, during the summer months, the vehicle cover 10 will reduce the temperature within the vehicle by blocking and deflecting harmful UV rays. The cover 10 will also block the rays from damaging the interior of the vehicle. In the winter months, the vehicle cover 10 may be used to block the accumulation of snow and/or ice on the windshield, driver side window, and passenger side window. The ice and/or snow will accumulate on the cover 10 itself, but normally can be shaken or swept from the cover 10 either before or after the cover is removed from the windshield. This will eliminate or reduce the time to clean a vehicle to make the vehicle safe for driving during the winter months. The cover 10 also precludes the wipers 68,70 from freezing to the windshield, and thereby increases the life of the wiper blades. However, it should be noted that covering the wipers with the cover 10 will also increase the life of the wipers by protecting the wipers from the elements when they are not in use.

Figure 5:
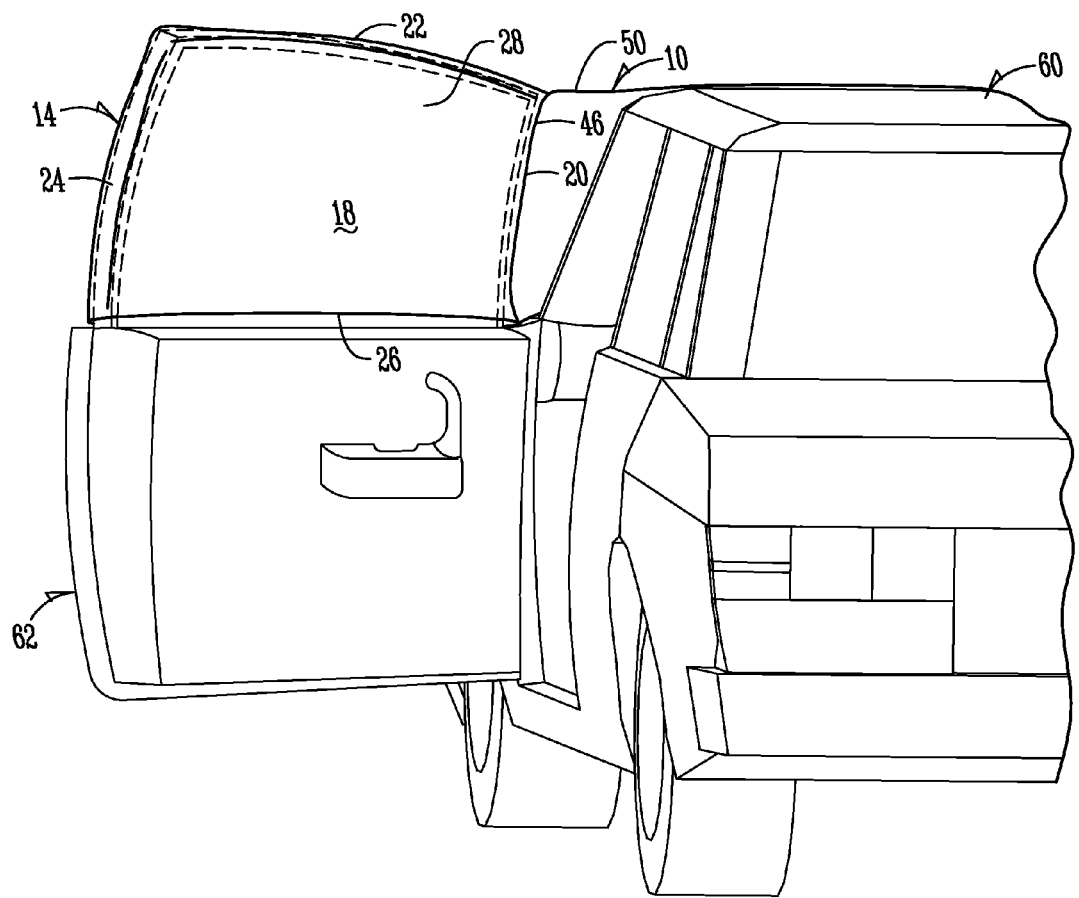
FIG. 5 is a partial view of the vehicle and vehicle cover showing the placement of the vehicle cover over the driver side window and frame.

FIG. 5 is a partial view of a vehicle 60 and vehicle cover 10 showing the placement of the vehicle cover 10 over the driver side window frame 62. As is shown in FIG. 5, the driver side pocket 28 fully encloses the driver side window and frame. As also shown in FIG. 5, the right wing panel 14, including the pocket 28, is connected to the central windshield panel 12 at the first side 20 of the right wing panel 14 in the right side 46 of the central windshield panel 12. The vehicle cover 10 covers the window and frame such that the cover does not compromise a door seal when in use. This is vital such that the use of the vehicle cover 10 will not create gaps between the window and frame and the rest of the vehicle such that precipitation will not penetrate the vehicle. The broken lines of FIG. 5 indicate the window and frame 62 of the driver side within the pocket 28 of the right wing panel 14 of the vehicle cover 10.

FIG. 6 is a perspective view of the vehicle cover 10 of the present invention. FIG. 6 shows the vehicle cover 10 apart from the vehicle. FIG. 6 shows that the right wing and left wing panels 14, 30 are attached to the central windshield panel 12 at the right and left sides 46, 48, respectively. Also shown in FIG. 6 is a carrying case 54. As shown, the carrying case 54 is connected to the vehicle cover 10. Although the carrying case 54 shown connected to the left wing panel 30 of the vehicle cover 10 in FIG. 6, it should be appreciated that the carrying case 54 may be attached anywhere on the vehicle cover 10. The vehicle cover 10 is foldable to be stored in the carrying case 54. Because vehicle cover 10 is made of a lightweight material, it may be folded down to a small size. Once inside the carrying case 54, the vehicle cover 10 may be stored in the vehicle in such a manner that does not take up much room. This may allow the carrying case 54, including the folded vehicle cover 10 to be placed in a trunk, a glove box, underneath a seat, or virtually anywhere in the vehicle such that it is not taking up useful space in the vehicle. In addition, although the carrying case 54 is attached to the vehicle cover 10, it should be appreciated that it will not impeded the intended purpose of the vehicle cover 10. It is further understood that the case 54 may be separate from the cover, or excluded entirely, without departing from the scope of the present invention.

The invention has been shown and described above with reference to the preferred embodiments, and it is understood that many modifications, substitutions, and additions may be made within the intended spirit and scope of the invention. The invention is only to be limited by claims appended hereto.

What is claimed is:

1. A vehicle cover for a vehicle having a windshield, a driver door with a window, and a passenger door with a window, the cover comprising:
    a central windshield panel;
    a right wing panel attached to the central windshield panel, the right wing panel including an outer portion, an inner portion, a closed first side, a closed second side, a closed third side, and an open fourth side;
    wherein the right wing panel forms a driver side pocket to fit over the driver door and cover the driver door window;
    a left wing panel attached to the central windshield panel, the left wing panel including an outer portion, an inner portion, a closed first side, a closed second side, a closed third side, and an open fourth side;
    wherein the left wing panel forms a passenger side pocket to fit over the passenger door and cover the passenger door window;
    the right and left wing panels maintaining the central panel in covering relation over the windshield when the pockets are placed over the driver and passenger doors; and
    the panels all being impervious to moisture so as to preclude moisture from contacting the windshield and door windows.

2. The vehicle cover of claim 1 wherein the closed third side of the right wing panel is attached to a right side of the central windshield panel.

3. The vehicle cover of claim 2 wherein the closed third side of the left wing panel is attached to a left side of the central windshield panel.

4. The vehicle cover of claim 1 wherein the panels are made of heat resistant fabric shielding a vehicle from UV exposure to keep a vehicle interior cool and protect the interior from damage.

5. The vehicle cover of claim 1 wherein the panels are made of water resistant fabric which will not deteriorate from repeated moisture contact.

6. The vehicle cover of claim 1 wherein the panels are made of flexible material.

7. The vehicle cover of claim 1 wherein the windshield panel protects a first and second wiper blade from environmental aspects so as to increase life span and assist in maintaining wiper blade function over time.

8. The vehicle cover of claim 1 wherein the inner portion and the outer portion of the right and left wing panels are connected from the top edge to the bottom edge to form the closed front edge of the panels.

9. The vehicle cover of claim 8 wherein the inner portion and the outer portion of the right and left wing panels are connected from the front edge to the rear edge along the top edge to form the closed top edge of the panels.

10. The vehicle cover of claim 9 wherein the inner portion and the outer portion of the right and left wing panels are connected from the top edge to the open bottom edge to form the closed rear edge of the panels.

11. The vehicle cover of claim 10 wherein the inner portion and outer portion of the right and left wing panels are connected from the first closed portion to the second closed portion to form the closed top portion of the panels.

12. The vehicle cover of claim 11 wherein the entire length of the third side of the left and right wing panels are connected to the central windshield panel.

13. The vehicle cover of claim 1 wherein the side panels and central panel define a cover with a height substantially equivalent to the height of the windshield and a length substantially equal to the cumulative widths of the windshield and door windows.

14. A vehicle cover for a vehicle having a driver door and a passenger door, with each door having a window, and having a windshield, the cover, comprising:
- an impervious central windshield panel having opposite left and right ends;
- an impervious right wing panel having a pocket between an inner portion and an outer portion to enclose the driver door window, and thereby protect the window from precipitation;
- a left wing panel having a pocket between an inner portion and an outer portion to enclose the passenger door window, and thereby protect the window from precipitation; and
- the right and left wind panels being connected to the opposite right and left ends of the central panel, respectively, to hold the central panel in position over the windshield when the panel pockets are placed over the door windows and thereby protect the windshield from precipitation.

15. A vehicle cover according to claim 14 which is secured during use via the entire door window frame of the vehicle and being free from elastic or mechanical fasteners, including hooks, straps, suction cups or magnets.

16. A vehicle cover according to claim 14 wherein the panels are made of heat resistant fabric shielding vehicle from UV exposure keeping the vehicle interior cooler and protecting interior from sun fade and heat damage.

17. A vehicle cover according to claim 14 wherein the panels are made of water resistant fabric which will not deteriorate from repeated moisture contact.

18. A cover according to claim 14 wherein the panels are made of non-freezable, flexible material.

19. A vehicle cover according to claim 14 wherein the central windshield panel protects first and second wiper blades from environmental aspects so as to increase their life span and assist in maintaining their function over time.

20. A vehicle cover according to claim 14 wherein the panels provide security for contents stored inside vehicle via partial concealment from external viewing.

21. A vehicle cover according to claim 14 wherein the pockets alone mount the cover to the doors.

22. A vehicle cover according to claim 14 wherein at least one of the panels has advertising thereon.

23. A vehicle cover according to claim 14 wherein the panels are reusable and fold for storage inside a storage bag secured to an inner portion of one of the wing panels.

24. The vehicle cover of claim 14 wherein the central panel and side panels form a cover with a length approximately equal to the cumulative widths of the doors and windshield.

* * * * *